United States Patent
Salles et al.

(10) Patent No.: US 11,961,401 B2
(45) Date of Patent: Apr. 16, 2024

(54) VEHICLE-TO-VEHICLE SENSOR DATA SHARING

(71) Applicant: TOYOTA MOTOR NORTH AMERICA, INC., Plano, TX (US)

(72) Inventors: Felipe G. Salles, Garland, TX (US); Shintaro Iwaasa, Frisco, TX (US); Louis Brugman, Frisco, TX (US); Devang H. Parekh, Dallas, TX (US); Robert D. Slater, Murphy, TX (US); Christopher J. Risberg, Flower Mound, TX (US); Nutonya L. Parker, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 179 days.

(21) Appl. No.: 17/673,745

(22) Filed: Feb. 16, 2022

(65) Prior Publication Data
US 2022/0172624 A1  Jun. 2, 2022

Related U.S. Application Data

(63) Continuation of application No. 16/438,199, filed on Jun. 11, 2019, now Pat. No. 11,315,427.

(51) Int. Cl.
*G08G 1/16* (2006.01)
*B60W 10/04* (2006.01)
(Continued)

(52) U.S. Cl.
CPC .............. *G08G 1/162* (2013.01); *B60W 10/04* (2013.01); *B60W 10/10* (2013.01); *B60W 10/18* (2013.01);
(Continued)

(58) Field of Classification Search
CPC ....... G08G 1/162; G08G 1/166; B60W 10/04; B60W 10/10; B60W 10/18; B60W 10/20;
(Continued)

(56) References Cited

U.S. PATENT DOCUMENTS

| 5,684,701 A | 11/1997 | Breed |
| 5,964,813 A | 10/1999 | Ishii et al. |

(Continued)

FOREIGN PATENT DOCUMENTS

| CA | 2685910 C | 7/2014 |
| CN | 101002239 B | 12/2010 |

(Continued)

OTHER PUBLICATIONS

Anonymous, "Development of a Verified Message Parser for V2V Communications", United States Department of Transportation, Office of Crash Avoidance Research Technical Publications,https://www.nhtsa.gov/crash-avoidance/office-crash-avoidance-research-technical-publications.

(Continued)

*Primary Examiner* — Michael V Kerrigan

(57) ABSTRACT

An example operation may include one or more of detecting a potential event via sensors on a transport, sending data related to the potential event to other transports within a predefined distance, storing the data at the transports and a server, and performing a transport operation response on the transports.

20 Claims, 12 Drawing Sheets

(51) Int. Cl.
*B60W 10/10* (2012.01)
*B60W 10/18* (2012.01)
*B60W 10/20* (2006.01)
*B60W 30/09* (2012.01)

(52) U.S. Cl.
CPC ............ *B60W 10/20* (2013.01); *B60W 30/09* (2013.01); *G08G 1/166* (2013.01); *B60W 2556/65* (2020.02); *B60W 2710/10* (2013.01); *B60W 2710/18* (2013.01); *B60W 2710/20* (2013.01); *B60W 2720/106* (2013.01)

(58) Field of Classification Search
CPC ............ B60W 30/09; B60W 2556/65; B60W 2710/10; B60W 2710/18; B60W 2710/20; B60W 2720/106; G06F 16/27; G06F 16/254
See application file for complete search history.

(56) References Cited

U.S. PATENT DOCUMENTS

| | | | |
|---|---|---|---|
| 6,185,490 | B1 | 2/2001 | Ferguson |
| 6,906,639 | B2 | 6/2005 | Pedersen et al. |
| 8,612,140 | B2 | 12/2013 | Gutman |
| 8,942,918 | B2 | 1/2015 | Hansen et al. |
| 8,947,531 | B2 | 2/2015 | Fischer et al. |
| 8,965,677 | B2 | 2/2015 | Breed et al. |
| 8,995,662 | B2 | 3/2015 | Rubin et al. |
| 9,153,084 | B2 | 10/2015 | Ricci |
| 9,261,376 | B2 | 2/2016 | Zheng et al. |
| 9,367,239 | B2 | 6/2016 | Pinkus et al. |
| 9,378,601 | B2 | 6/2016 | Ricci |
| 9,507,346 | B1 | 11/2016 | Levinson et al. |
| 9,619,203 | B2 | 4/2017 | Tamir et al. |
| 9,711,050 | B2 | 7/2017 | Ansari |
| 9,755,850 | B2 | 9/2017 | Stolfus |
| 10,019,009 | B2 | 7/2018 | Chintakindi et al. |
| 10,054,947 | B2 | 8/2018 | Mays |
| 10,086,699 | B2 | 10/2018 | Konet et al. |
| 10,207,583 | B2 | 2/2019 | Dudar et al. |
| 10,324,463 | B1 | 6/2019 | Konrardy et al. |
| 10,719,501 | B1 | 7/2020 | Leise et al. |
| 2005/0131597 | A1 | 6/2005 | Raz et al. |
| 2006/0104712 | A1 | 5/2006 | Bufano et al. |
| 2006/0206261 | A1 | 9/2006 | Altaf et al. |
| 2008/0004802 | A1 | 1/2008 | Horvitz |
| 2009/0079839 | A1 | 3/2009 | Fischer et al. |
| 2011/0043635 | A1 | 2/2011 | Fujita et al. |
| 2013/0279491 | A1 | 10/2013 | Rubin et al. |
| 2013/0282277 | A1 | 10/2013 | Rubin et al. |
| 2015/0228129 | A1 | 8/2015 | Cox et al. |
| 2015/0344038 | A1 | 12/2015 | Stenneth et al. |
| 2016/0071417 | A1 | 3/2016 | Lewis et al. |
| 2016/0282874 | A1 | 9/2016 | Kurata et al. |
| 2018/0209803 | A1 | 7/2018 | Rakah et al. |
| 2018/0251092 | A1 | 9/2018 | Lee et al. |
| 2019/0084560 | A1 | 3/2019 | Lee |
| 2019/0088135 | A1 | 3/2019 | Do et al. |
| 2019/0102840 | A1 | 4/2019 | Perl et al. |
| 2019/0206255 | A1 | 7/2019 | Tao et al. |
| 2019/0210612 | A1 | 7/2019 | VanLandingham et al. |
| 2020/0314772 | A1* | 10/2020 | Roth-Mandutz ...... H04W 76/50 |

FOREIGN PATENT DOCUMENTS

| | | |
|---|---|---|
| CN | 1714275 B | 2/2012 |
| CN | 103035140 B | 9/2014 |
| CN | 102163368 B | 10/2014 |
| CN | 105261225 A | 1/2016 |
| CN | 107346611 A | 11/2017 |
| CN | 108292474 A | 7/2018 |
| CN | 109313445 A | 2/2019 |
| EP | 0635800 A1 | 1/1995 |
| EP | 2165321 B1 | 12/2018 |
| JP | 2004021331 A | 1/2004 |
| JP | 2009205368 A | 9/2009 |
| JP | 2019501072 A | 1/2019 |
| KR | 20150128712 A | 11/2015 |
| KR | 101628199 B1 | 6/2016 |
| KR | 101823994 B1 | 2/2018 |
| KR | 20180087395 A | 8/2018 |
| RU | 2571450 C2 | 12/2015 |
| WO | 2012124877 A1 | 9/2012 |

OTHER PUBLICATIONS

Anonymous, Ford showcasing vehicle-to-vehicle communication for crash avoidance; potential for leveraging WiFi and smartphones to extend quickly the number of participating vehicles ,https://www.greencarcongress.com/2011/07/fordv2v-20110719.html.

Biswas et al.; "Vehicle-to-vehicle wireless communication protocols for enhancing highway traffic safety"; IEEE Communications Magazine; vol. 44 , Issue: 1 , Jan. 2006; pp. 74-82.

Final Office Action issued in the parent U.S. Appl. No. 16/438,261, dated Feb. 27, 2020.

Huang et al., An early collision warning algorithm for vehicles based on V2V communication , International Journal of Communication Systems archive, vol. 25 Issue 6, Jun. 2012, pp. 779-795.

Kassem et al., "Vehicle Black Box System," 2008 2nd Annual IEEE Systems Conference, Montreal, Que., 2008, pp. 1-6.

Lawrence et al., "The Accuracy of Pre-Crash Speed Captured by Event Data Recorders", https://www.sae.org/publications/technical-papers/content/2003-01-0889/.

Notice of Allowance issued in the parent U.S. Appl. No. 16/438,261, dated May 6, 2020.

Office Action issued in the parent U.S. Appl. No. 16/438,261, dated Sep. 12, 2019.

* cited by examiner

500

VEHICLE-TO-VEHICLE SENSOR DATA SHARING

CROSS-REFERENCE TO RELATED APPLICATIONS

This application is a continuation of U.S. patent application Ser. No. 16/438,199, filed on Jun. 11, 2019, now U.S. Pat. No. 11,315,427, issued on Apr. 26, 2022, the entire disclosure of which is incorporated by reference herein.

TECHNICAL FIELD

This application generally relates to vehicle data sharing, and more particularly, to vehicle-to-vehicle sensor data sharing.

BACKGROUND

Vehicles or transports, such as cars, motorcycles, trucks, planes, trains, etc., are generally moving at high speeds and experiencing varying conditions, such as road conditions, traffic patterns, unsafe drivers of other vehicles, vehicle conditions, safety conditions, weather conditions, etc. The vehicle data may be received from sensors on, and in the vehicle, and/or which may be captured by computing devices, such as a computer that controls the vehicle itself and/or via a controller held and managed by a user, such as a smartphone or a computer.

Currently, the amount of data shared by common vehicles, such as an automobile, is minimal but will continue to increase. What is needed is a system that is optimized to store and utilize such data. A current manner in which to store such data is a centralized database. However, a centralized database suffers from significant drawbacks. For example, a centralized database has a single point of failure. In particular, if there are no fault-tolerance considerations and a failure occur (for example a hardware, firmware, and/or a software failure), all data within the database is lost and work of all users is interrupted. Furthermore, because a database storage system has minimal to no data redundancy, data that is unexpectedly lost is very difficult to retrieve. Conventionally, a centralized database is limited by its ability to prevent fraudulent claims made by entities attempting to submit multiple claims for a single occurrence. Information that is important, such as safety information, collision information, etc., may require further data management infrastructure and procedures.

SUMMARY

One example embodiment may provide a system that includes a processor and one or more sensors on a first transport, a second transport, a memory that stores instructions that when executed by the processor, cause the processor to perform one or more of detect, by the one or more sensors, a potential event, send data related to the potential event to the second transport, wherein the second transport is within a distance from the first transport, store the data on the second transport, and send the data from the second transport to a server.

Another example embodiment may provide a method that includes one or more of detecting a potential event, by at least one sensor on a first transport, sending data related to the potential event to a second transport, wherein the second transport is within a distance of the first transport, storing the data on the second transport, and sending the data from the second transport to a server.

A further example embodiment may provide a non-transitory computer readable medium comprising instructions, that when read by a processor, cause the processor to perform one or more of detecting a potential event, by at least one sensor on a first transport, sending data related to the potential event to a second transport, wherein the second transport is within a distance of the first transport, storing the data on the second transport, and sending the data from the second transport to a server.

A yet further example embodiment may provide a method comprising one or more of detecting a potential event via one or more sensors disposed on a transport, transmitting data associated with the potential event from the transport to one or more additional transports located within a predefined distance of the transport, triggering a transport operation response based on the transmitted data, and performing the transport operation response via the transport and the one or more additional transports.

A yet further example embodiment may provide a system comprising a processor and one or more sensors on a first transport, a memory that stores instructions that when executed by the processor, cause the processor to perform one or more of detect a potential event via the one or more sensors, identify a smart contract associated with the potential event, execute the smart contract responsive to detecting the potential event, send data associated with the potential event from the first transport to one or more additional transports located within a distance of the transport, trigger an operation response based on the sent data, and perform the operation response via the transport and the one or more additional transports.

A yet further example embodiment may provide a non-transitory computer readable medium comprising instructions, that when read by a processor, cause the processor to perform one or more of detecting a potential event via one or more sensors disposed on a transport. transmitting data associated with the potential event from the transport to one or more additional transports located within a predefined distance of the transport, triggering a transport operation response based on the transmitted data, and performing the transport operation response via the transport and the one or more additional transports.

DETAILED DESCRIPTION

Figure 1A:
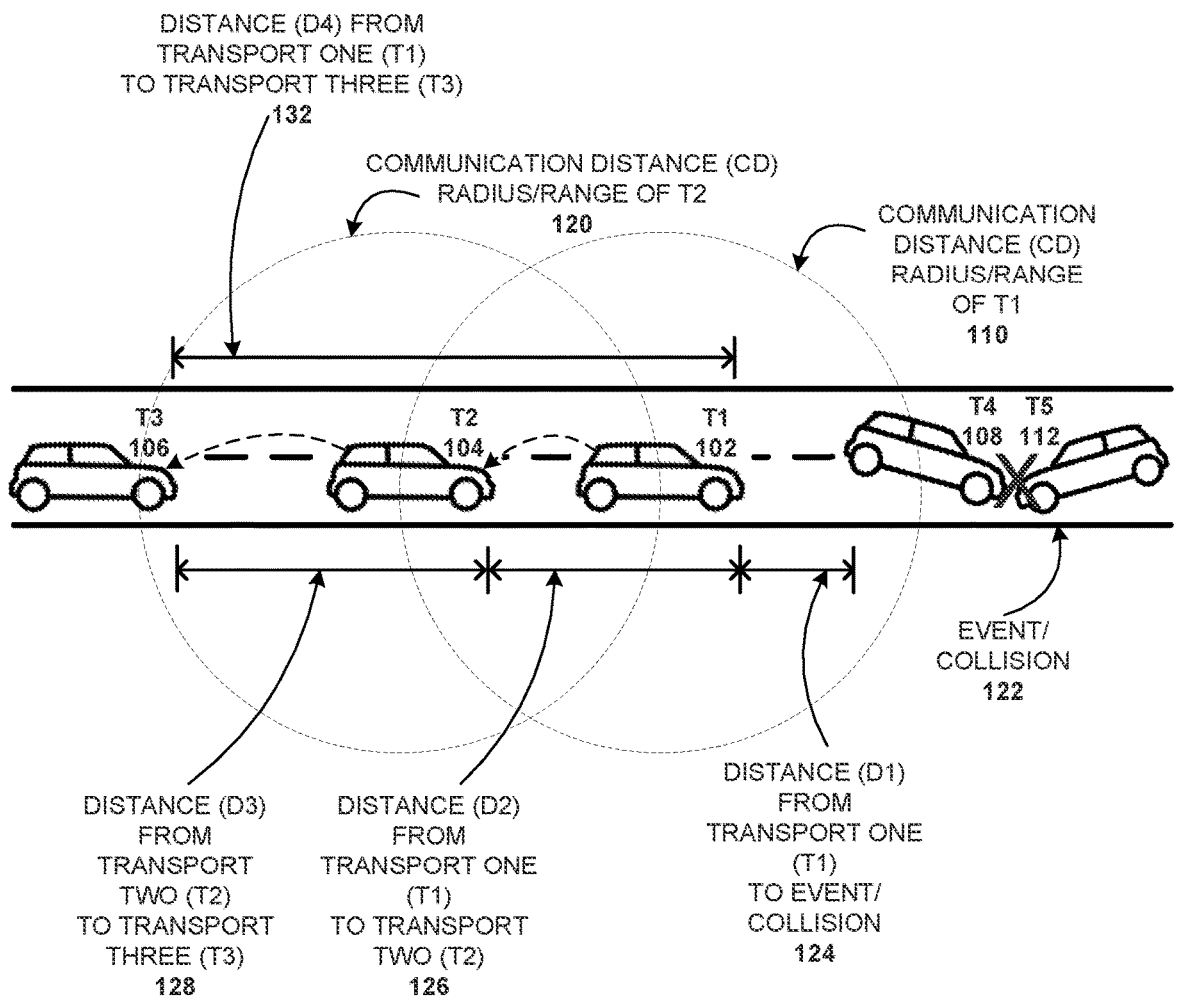
FIG. 1A illustrates a diagram of a sensor data sharing event among various transports on a roadway, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) sensor data collection system, a verification system, and a vehicle data distribution system. The sensor data, received in the form of communication update messages, such as wireless data network communications and/or wired communication messages, may be received and processed to identify vehicle/transport status conditions and provide safety and optimal transport modification options to assist with vehicle travel.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for vehicle sensor information to be identified and actions to be taken, if necessary. A transaction on a shared ledger may be generated and may be committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a collision event, identify a safety concern event, identify parties to the event and provide distribution to registered entities seeking access to such vehicle sensor data. Also, if a collision results in fault being identified, the necessary information can be shared among the registered companies and/or individuals based on a "consensus" approach associated with the blockchain. Such an approach could not be implemented on a traditional centralized database.

The instant application includes vehicle sensors and/or corresponding computer controllers that are configured to share relevant data that is likely to assist other vehicles, detect/avoid dangerous conditions, and assist third parties with identifying those parties at fault in the event of a collision or other significant vehicle events. Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a diagram of a sensor data sharing event among various transports on a roadway, according to example embodiments. Referring to FIG. 1A, the diagram 100 includes various transports T1 (102), T2 (104), T3 (106), T4 (108), T5 (112). The roadway may represent a neighborhood road or a highway with traffic in one or both directions. In this example T4 and T5 have collided in an event 122 which is a collision, in one embodiment. In other embodiments, an event may be a high rate of speed, erratic driving/maneuvering, excessive/hard braking, etc. The event is additionally identified from one or more nearby transports. The closest transport/vehicle, which is not a party to the collision, at the time of the accident/collision is T1. The event collision 122 may include one or more of the vehicles in the collision emitting an emergency signal which is detected by any of the other vehicles via a V2V communication configuration. Also, in another example, the closest vehicle T1 (102) may be the first to identify the collision via one or more sensors on T1. The distance D1 124 from T1 to the collision location 122 may be within a detectable range where the sensors on the vehicle can detect a collision. The sensors may provide information in the form of data, sound, video, etc. The distance D2 126 between T1 and T2 may be within a short-range communication distance (i.e., radius 110) of another vehicle T2 104. As shown in the illustration 100, the distance from T1 to T2 is within the communication range, and thus a direct communication may be sent from T1 to T2 to notify of the collision ahead. In other embodiments, the data can be communicated by one transport to a server (not shown) which can then send the data to another transport.

If other vehicles are not within the communication range of the first vehicle T1 to detect the collision, such as T3 106 (which is a larger distance D4 132 from T1), then the second vehicle T2 may be the initiator of a V2V information transfer to inform T3 of the collision ahead. The distance from T2 to T3 is D3 128, which is within the communication radius 120 of T2. In this manner, the collision event data may be transferred along in a row of vehicles from one to the next, and so on. In other embodiments, the event 122 can be detected by a vehicle traveling in an opposite direction (not shown) than T1 and such a vehicle can independently, via V2V communication, provide information of the event to T1, T2, T3, etc. The actions necessary to prevent additional incidents from occurring may include different commands being sent to different vehicles depending on their positions with respect to the detected event 122, which is described in further detail herein.

Any of the vehicles T1-T5 may include sensors on any portion of the interior and/or exterior of a vehicle. The sensors may be hardwired to a central controller or other processor of the vehicle or may be in wireless communication with a central controller of the vehicle's computer via various wireless communication protocols. The data may be transmitted from the central controller, such as an on-board computer, a user's smartphone, a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc.

The types of sensors include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors, and the like.

In an effort to create an incentive for autonomous-vehicle owners and/or operator driven vehicles to share the data collected by their vehicles' sensors, certain compensation may be provided to those vehicles which share information with other vehicles. As a vehicle collects sensor data from the sensors or via user computer devices and/or on-board computing devices, the data is collected and organized by sensor type. For purposes of this example, the sensor data, may be organized according to the sensor from which it was received and/or the device which produced the sensor data. Also, the computer devices which collect information may have such information be deemed 'sensor data' which is also forwarded to other vehicles and/or a central server. The managerial entity responsible for managing the sensor data server may be a third party which manages the sensor data and the accounts associated with each vehicle.

Autonomous vehicles may be regulated where sensor data is mandated for various reasons since operation of the vehicle is controlled by a computer and not necessarily a person. As a result, the sharing of the sensor data gathered by autonomous vehicles may be required by various agencies and third parties to ensure safety measures. As noted previously, the vehicles T1-T5 may be vehicles operated by a human driver or an autonomous vehicle operated by a computer and/or remote agent. The vehicle sensor data may be collected via a plurality of the vehicle sensors 106. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, among sensors 106, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, etc. The VDRs may be registered to receive certain vehicle sensor data sets depending on the interests of the particular VDRs.

Owners of autonomous/non-autonomous vehicles (or occupants of the vehicles) may register their profiles in a shared ledger or other data management system so the information collected during sensor collection efforts may be shared and the owner's profile and/or vehicle may be credited with a predetermined value also identified in the shared ledger, via a smart contract. The smart contract may identify the parties of the agreement, permissions to share data, types of data sought by the VDR(s), compensation for the data and other parameters.

In one example, a third-party seeking access to the vehicle sensor data may be a car manufacturer. In another example, the gathered sensor data could include traffic volume/pattern information, such as a number of cars that pass a particular intersection, car speeds on certain roadways, etc., gathered from a population of vehicles and aggregated into sensor data sets, such data may be desired by certain municipalities. Also, other types of private data may be exchanged for some type of benefit/credit. For example, for sharing data with a manufacturer, the vehicle may be eligible for a credit (monetary or non-monetary), identified via the smart contract and recorded in the shared ledger. The credit may be offered by the manufacturer and may include a service update. For example, an autonomous vehicle may receive a free oil change and may navigate to the manufacturer dealer for the service. As the vehicle arrives, the credit is identified from a transaction in the shared ledger, as the service is redeemed, another transaction may be written to redeem the value owned by the vehicle profile. In this manner, the vehicle receives the credit and not the owner and/or occupant. In other embodiments, the credit can be divided among one or more vehicles, owners and/or occupants.

The immutability of the sensor data may also be preserved via the shared ledger format of a blockchain. The vehicle owner ultimately selects to share their data by storing it in a blockchain that exists in a cloud network. The blockchain can also facilitate the reward aspect, whether in a conventional manner or via tokens or other types of reward. In one example, the vehicles offload their sensor data to the cloud over a wireless communication network (e.g., mobile cellular network). The data is added to a blockchain but remains under the control of the vehicle owner from where such data was obtained until the vehicle owner decides to share some or all of the data. The conditions may be outlined in the smart contract which is used by the shared ledger to perform the sharing, crediting and distribution of data.

Figure 1B:
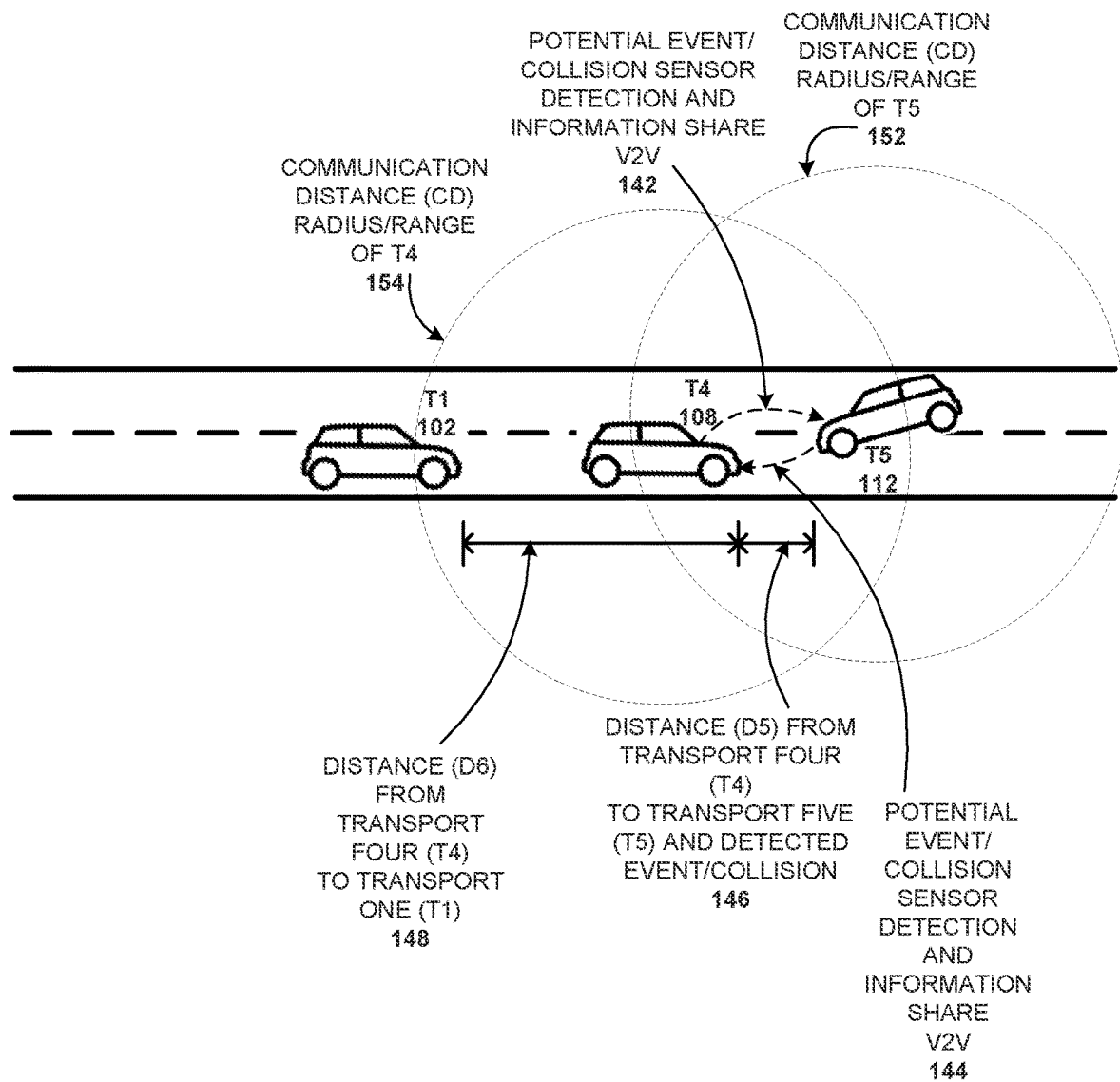
FIG. 1B illustrates another sensor data sharing event among various transports on a roadway, according to example embodiments.

FIG. 1B illustrates another sensor data sharing event among various transports on a roadway, according to example embodiments. Referring to FIG. 1B, the configuration 150 includes a scenario where the collision has not yet occurred as T4 108 and T5 112 are still a certain distance apart, however, a sensor operating on T4 has detected a potential collision event 142 by identifying a position and location of T5. A communication distance 152 of T5 may emit a V2V signal to notify moving and/or fixed objects that the position, speed, movement, behavior, etc., of T5 are identifiable as being a potential event, such as a collision threat. For example, sensors on T5 and/or T4 may identify erratic driving behavior based on speed, direction, position within the driving lane, etc., and may alert other objects, such as T5 detecting 144 and notifying any vehicle within its communication range 152, such as T4, or T4 notifying T1 102 and T5 by detecting T5's out-of-zone position on the roadway. In this example T5 may notify T4 which notifies T1. In another example T4 may be alerted by T5's position and may alert T1. The distance between T5 and T4 may be D5 146, and the amount of time before a collision may be calculated to be very small and thus an imminent collision is likely. The distance from T1 to T4 148 may be within T4's communication radius 154, and the distance from T1 to T5 may be outside T5's communication radius 152. In other embodiments, the data can be communicated by one transport to a server (not shown) which can then send the data to another transport. In other embodiments, the potential event 144 can be detected by a vehicle traveling in an opposite direction (not shown) than T4 or T5 and such a vehicle can independently, via V2V communication, provide information of the event to T1, etc. If the potential event does not occur (i.e. a collision is avoided), the data can still be communicated to one or more of the transports and/or the server.

Figure 1C:
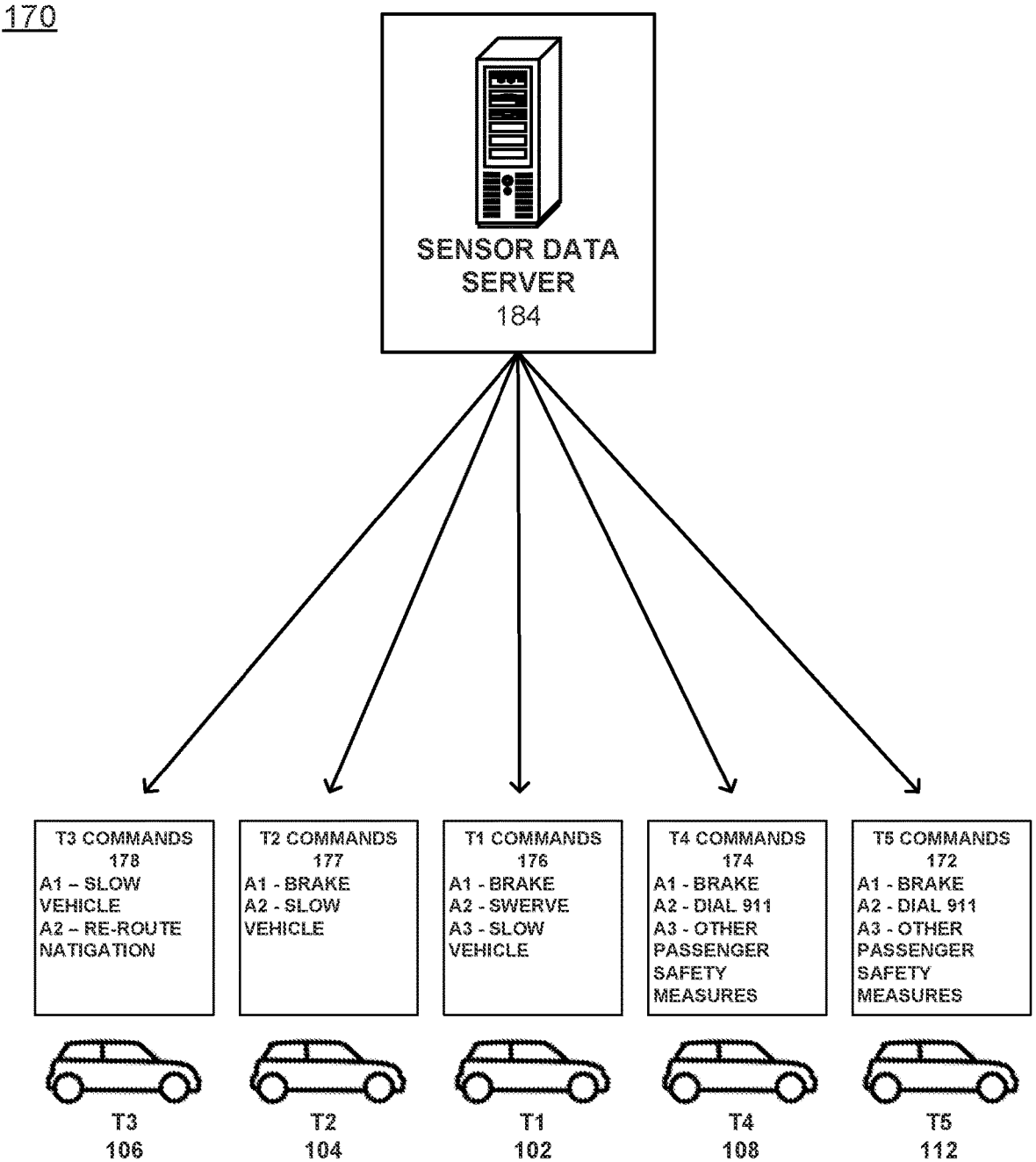
FIG. 1C illustrates a diagram of a sensor data server distributing action commands to various transports, according to example embodiments.

FIG. 1C illustrates a diagram of a sensor data server distributing action commands to various transports, according to example embodiments. Referring to FIG. 1C, the example 170 provides that for all the vehicles identified during the collision event, the V2V information shared among those vehicles, and the locations of those vehicles with respect to the collision location, each create customized and automated strategies for assisting those transports in the wake of such an event. For example, once it is established that vehicles T4 108 and T5 112 are part of the collision event, the information shared with a central server 184 at a remote location or a local computer, such as one included in one or more of the transports, may have a response strategy based on the information received (which may be audio, video, text, other data, etc.). For example, if T4 and T5 produce collision data, high velocity data, etc., then the response commands sent to those transports T4 and T5 may include various commands 172/174, such as brake, dial EMS-911, deploy airbags, turn off transports, swerve the steering wheel away from other objects, etc. However, collisions which could not be detected prior to their occurrence will not be able to deploy preventative actions but could deploy post-collision actions. However, those transports around and/or near the collision location may benefit from receiving commands to assist the transport with preventative actions. For example, T1 102 and T2 104 may receive commands 176/177 to brake, swerve and/or slow down, etc. Those commands may be created automatically and may cause automatic action by the transport without user intervention as the commands are sent from the sensor data server 184 to the transports (T1-T5). Since T3 106 is further away from the collision location, the actions sent 178 may include slowing of the transport since that transport is not near the collision but should anticipate the collision in the near future. However, in this case, it is not too early to anticipate a change in navigation since the collision will cause congestion.

Figure 1D:
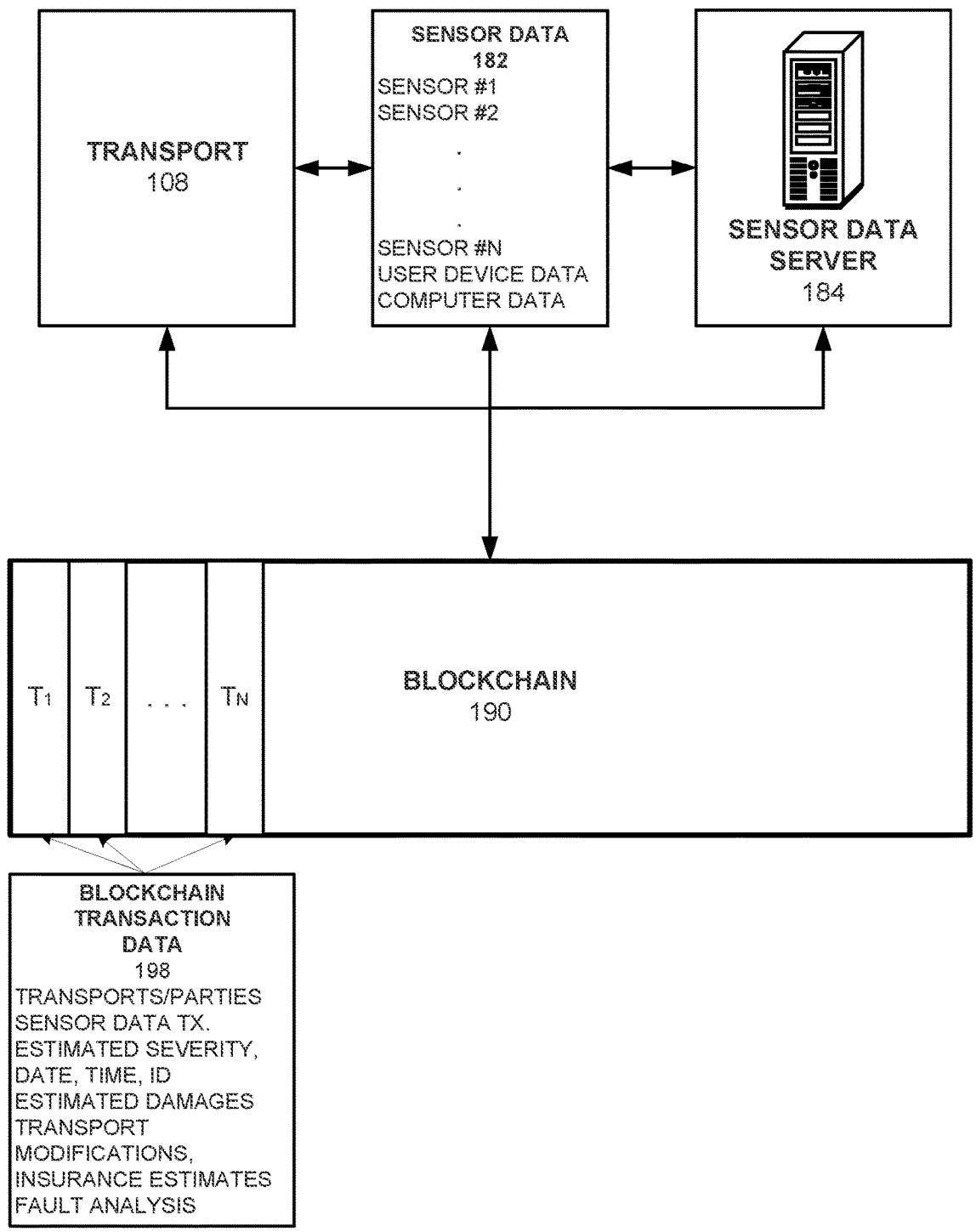
FIG. 1D illustrates a blockchain configuration for storing blockchain transaction data, according to example embodiments.

FIG. 1D illustrates a logic diagram of a vehicle sensor data collection system utilizing a shared ledger, according to example embodiments. Referring to FIG. 1D, the data management configuration 180 includes a transport 108, which receives sensor data, stores certain sensor data, shares the sensor data with other transports and/or forwards the sensor data 182 to the sensor data server 184 which maintains profiles of vehicles and other management entities seeking access to the sensor data 182. The blockchain 190 identifies the data being collected, shared and transferred to third parties and logs the instances of such transfers via individual blockchain transactions, each having corresponding blockchain data 198. Content of a blockchain transaction data block may include the parties to a collision, data transmitted, estimated damages, transport commands/modifications issued during collision detection, terms, dates, times, types of data, compensation provided, permissions confirmed, vehicle information including the sensor types of data and the sensor data categories, insurance information, fault analysis data for collision record keeping, etc. The shared ledger logs the data in the form of transactions for use by one or more smart contracts, subsequent audits, interested parties seeking to identify the transaction validity and confirm the existence of an event, etc.

Figure 2A:
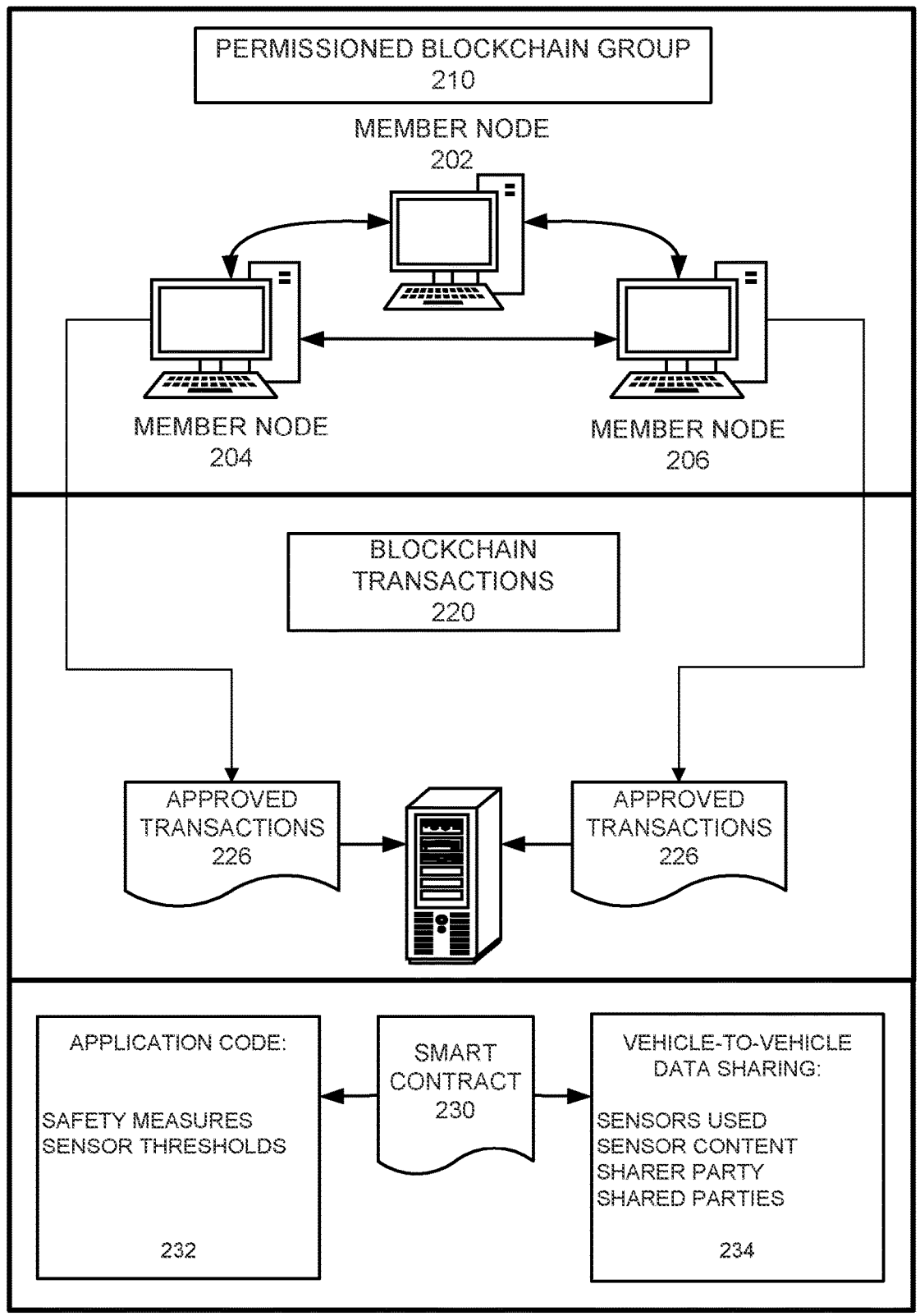
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a permissioned blockchain group 210. The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify when sensor data exceeds various thresholds (such as impact, speed, braking, etc.) and other measures. For example, when a collision sensor is triggered, and a vehicle velocity is above a particular threshold prior to the collision, then the action may include providing emergency measures to the transports, the transports near the collision, etc. The vehicle sensor data may be based on vehicle data sharing agreements to include permissions granted to share vehicle sensor data, registered parties to receive the data, and types of sensor data to share, etc., 234.

Figure 2B:
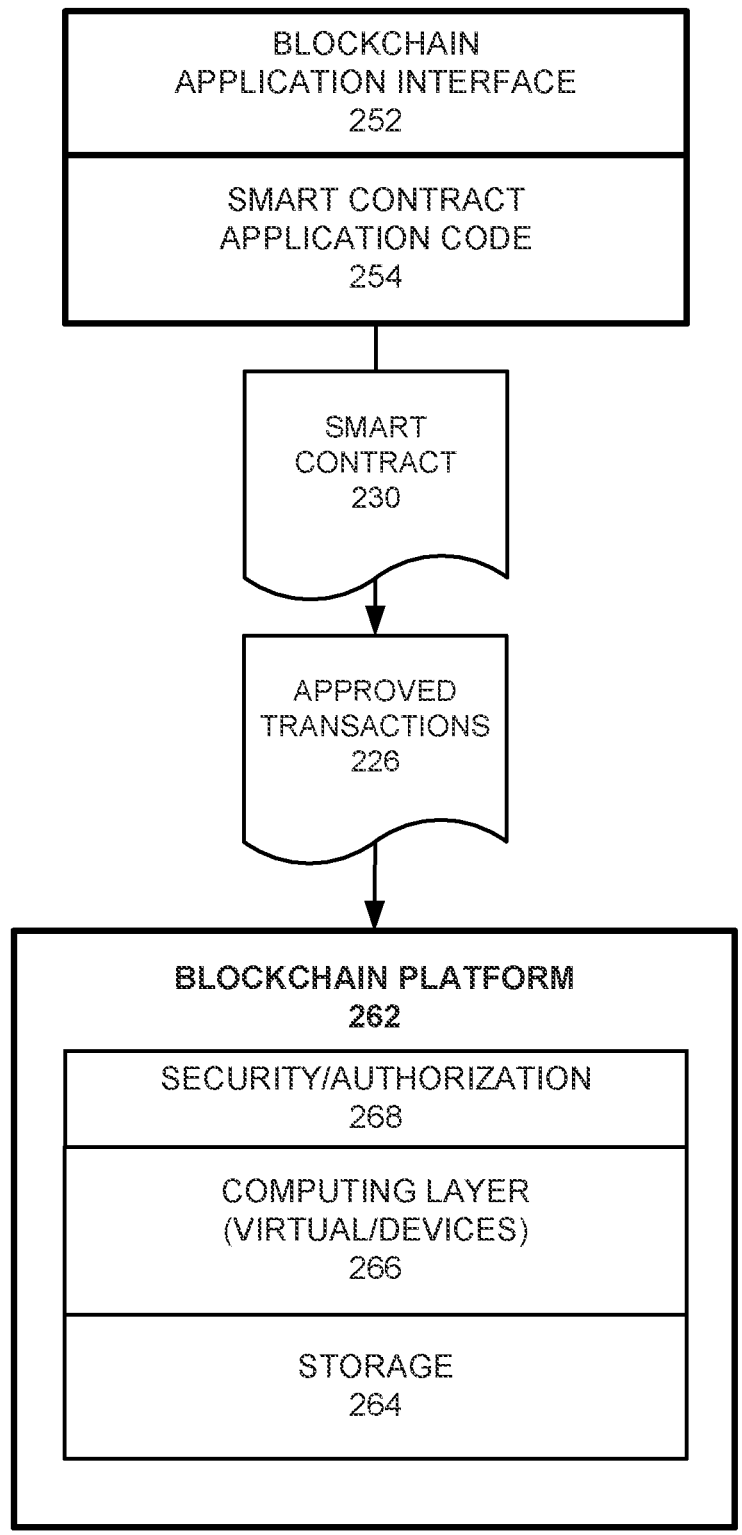
FIG. 2B illustrates a shared ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry claim, which may be processed by one or more processing entities (e.g., processors, virtual machines, etc.) included in the blockchain layer. The result may include a decision to reject or approve the claim based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3:
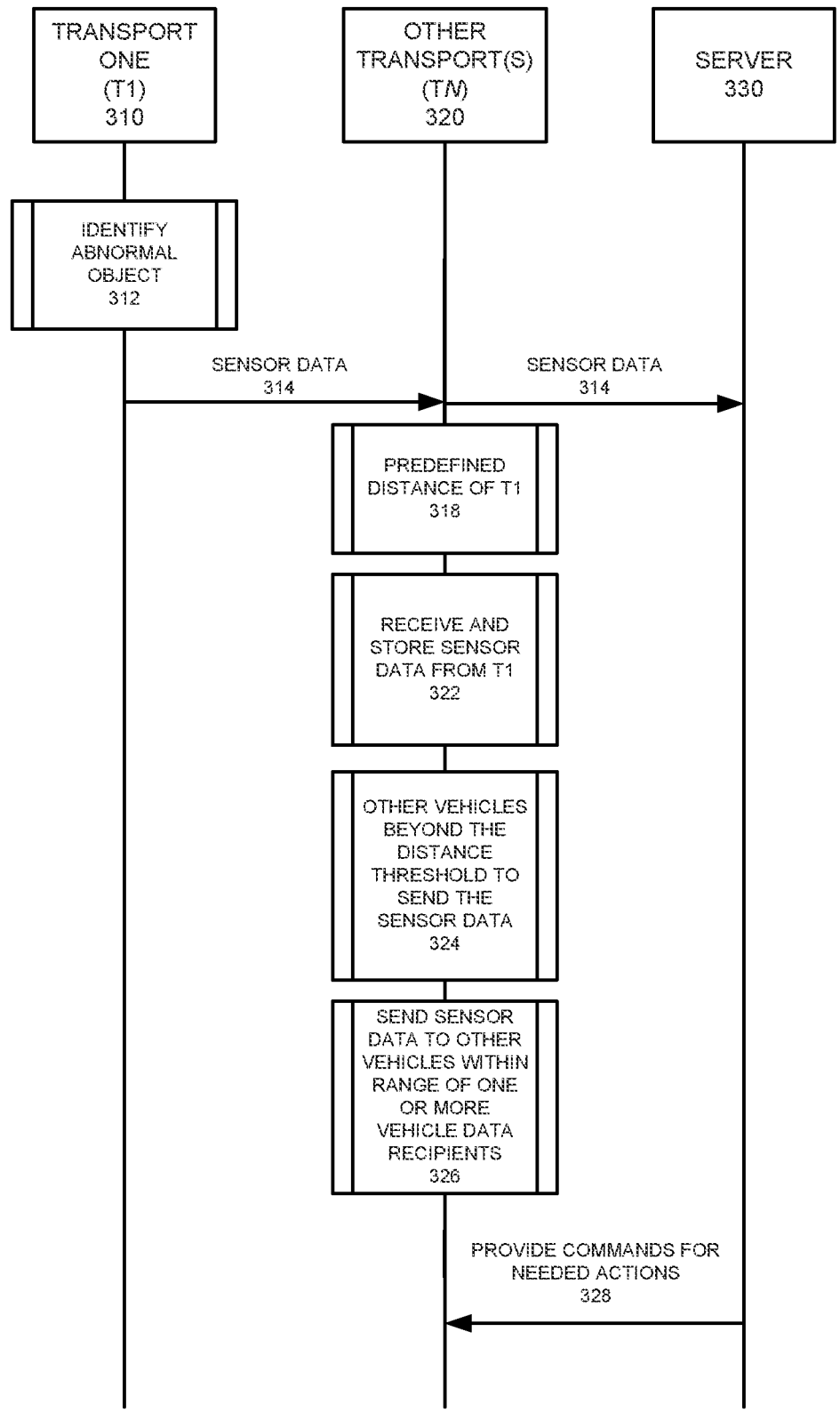
FIG. 3 illustrates a transport sensor data sharing system configuration, according to example embodiments.

FIG. 3 illustrates a transport sensor data sharing system configuration, according to example embodiments. Referring to FIG. 3, the system 300 provides a transport 310 which offers sensor data to other transports 320 via V2V information sharing and/or to a server 330. The data may be sent to a wireless network via a mobile device, a cellular computing device installed in the vehicle, a local communication TX/RX pair that operates on high frequency short range communications, etc. The sensor data may be sent to the server 330 and when a vehicle profile is identified, smart contract information may be provided from a blockchain to engage the vehicle sensor data categorization and data sharing in general. In operation, when an object is identified 312 by transport 310 (which may be a primary transport), then the sensor data 314 which identifies the object may be sent to the other transports 320 directly via V2V communication and/or via the server 330.

Decisions may be made to perform immediate actions for safety, subsequent remedial measures, collect pre-event information, and/or to collect fault and/or to collect post-event (such as post-collision) information for interested parties. When determining which transports with which to share the collision or potential collision information, a distance function 318 may be used to identify the distances of other transports 320 with respect to the primary transport 310. The other transports within the communication range of T1 may receive and store 322 the sensor data from T1. Other transports which are beyond that communication distance may also receive the same information from other sources such as the server 330. In another embodiment, those versions may be from additional transports between the primary transport and the other transports. For example, a third or fourth transport that is further away from the primary transport (beyond a distance threshold) 324 may receive the sensor data from another transport 326 that is closer to the primary transport, such as the second transport, provided that the third or further transport is in a communication range of any transport that has received the sensor data and updated information regarding the collision/potential event. The server 330 may process the data that is received and provide customized actions to each of the transports which operate within the network. For example, the commands may be sent from the server to each of the transports 328 in a manner that is based on their locations with respect to the collision/potential event location. For example, the closest vehicle may receive five commands to prepare for subsequent safety measures and adjusted transport operation, the next closest transport may only receive three commands to slow down and be aware of the event. A transport that is a half a mile away may receive only one command to find another route, to switch one or more lanes, etc. due to the collision congestion.

Certain smart contract terms may be identified and executed to translate the sensor data into pre-collision and/or post-collision remedies which are identified in executable code in the smart contract. For example, the smart contract code may dictate actions, such as if a collision is detected and a velocity is over a certain speed, various safety measures should be taken, parties should be notified, documentation of the event should be performed and committed to the blockchain, etc.

Figure 4A:
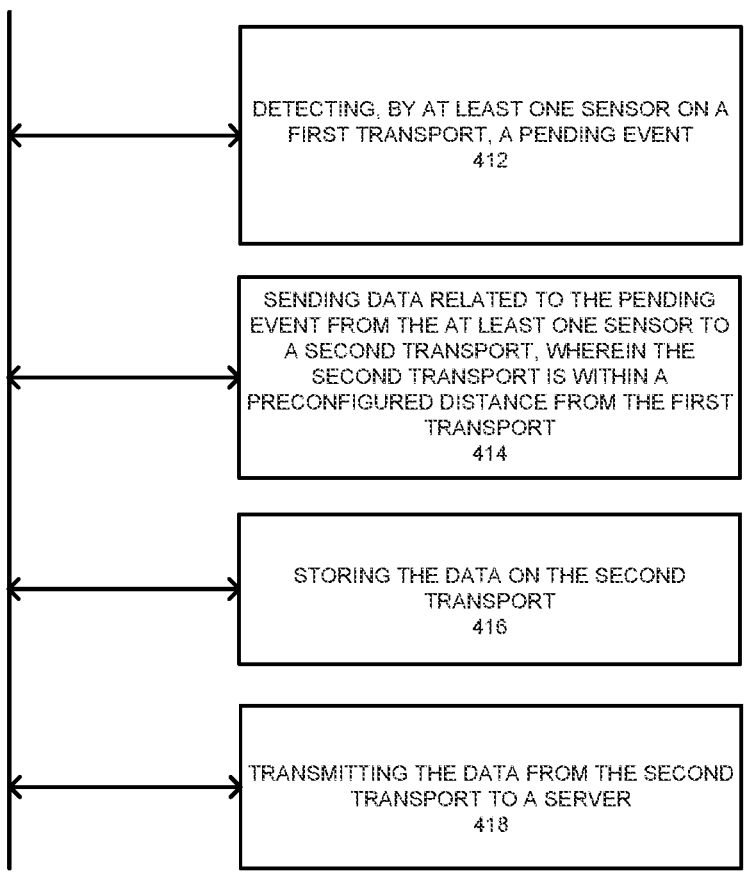
FIG. 4A illustrates transport sensor data sharing flow diagram, according to example embodiments.

FIG. 4A illustrates transport sensor data sharing flow diagram, according to example embodiments. Referring to FIG. 4A, the example flow diagram 400 includes one or more of detecting, by at least one sensor on a first transport, a potential event 412, sending data related to the potential event from the at least one sensor to a second transport, and the second transport is within a distance from the first transport 414, storing the data on the second transport 416, and sending the data from the second transport to a server 418. The primary transport may be initiating an offload of critical data necessary to document and identify the details of the collision, such as parties, fault, cause, etc. If the primary vehicle were to be compromised (i.e., badly damaged or destroyed) in the collision, then some or all of the collected sensor data may be sent to another vehicle (which may be traveling in a same direction and/or a different direction than the primary transport), and/or a remote server for subsequent forensic purposes. During a critical event (i.e., an event where the threat of harm is above a predefined level due to velocity, sensor data, etc.), the critical event threshold may cause an information sharing event via cellular, V2V information sharing, etc., where all sensor data leading up to the event and after the event is shared with a remote server and/or a neighboring transport to preserve the data for future audits/reviews.

An example system may include a processor and at least one sensor on a first transport, a second transport and a memory storing instructions that when executed by the processor, cause the processor to perform one or more of detect, by the at least one sensor, a potential event, send data related to the potential event from the at least one sensor to the second transport, wherein the second transport is within a distance from the first transport, store the data on the second transport, and send the data from the second transport to a server.

In one embodiment, the potential event is an imminent contact with a fixed and/or mobile object, the data related to the imminent contact (and/or an actual contact) is sent to a further transport and is stored and/or sent by the further transport to a server. In one example, as data is received, the data is sent to a first transport at a first time and a second transport at a second time, where the second time is later than the first time. When the server determines that all data is received from the potential event, data can be removed from one or more of the transports. Data in the server from the one or more transports are compared to determine a sequence related to the pre-event and/or post-event, to determine one or more next actions, to determine a state of one or more of the transports at the time that the data was sent to the one or more transports and/or the server. In one example, detection of a potential event and/or an actual event is from of a sensor on moving object and/or a sensor on a non-moving object. In one example, the data is one or more of audio, video, sensor data captured in a transport, sensor data related to a transport, data related to an outside surrounding area of the transport, data related to other transports, data related to fix objects, data related to occupants within the transport, data related to individuals outside the transport, etc. In another example, data related to a potential and/or an actual event is sent to another transport and/or a server immediately and/or after a period of time. Further, only certain data may be sent while other data may not be sent at all or may be sent at a later time if deemed to be necessary.

Figure 4B:
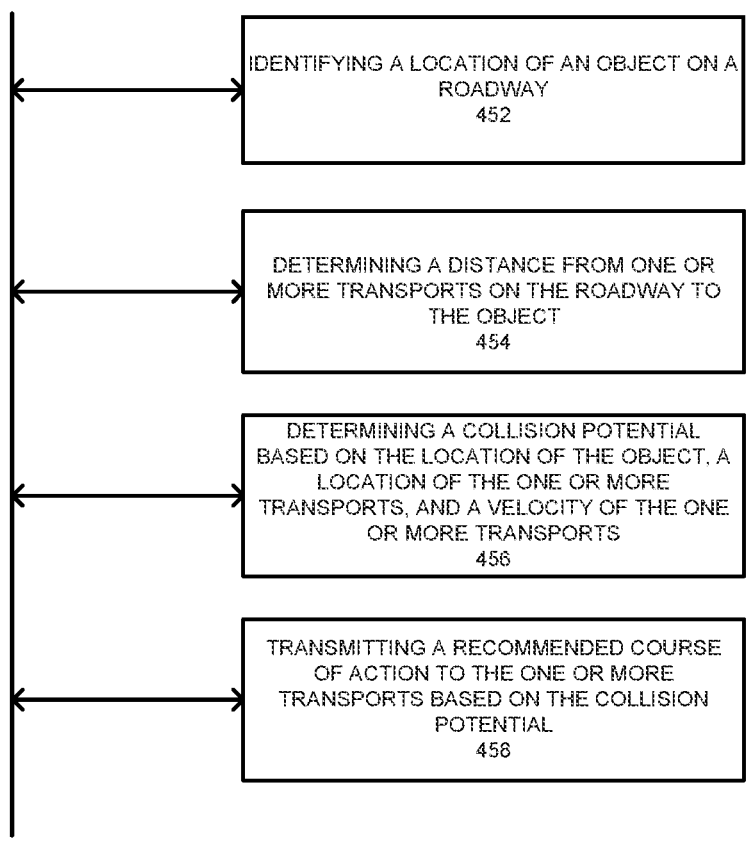
FIG. 4B illustrates a further transport sensor data sharing flow diagram, according to example embodiments.

FIG. 4B illustrates a further transport sensor data sharing flow diagram, according to example embodiments. Referring to FIG. 4B, the flow diagram 450 provides one or more of identifying a location of an object on a roadway 452, determining a distance from one or more transports on the roadway to the object 454, determining a collision potential based on the location of the object, a location of the one or more transports and a velocity of the one or more transports 456 and sending a recommended course of action to the one or more transports based on the collision potential. The severity of the collision potential may be a function of a distance to impact (d), a speed of the vehicle (s or v) and a time to the collision (t). The function may be t=d/s. The distance may be estimated by one or more of a sensor on the transport which identifies the object's location with respect to the vehicle, a device associated with an occupant in the transport, infrared, and lidar.

Figure 4C:
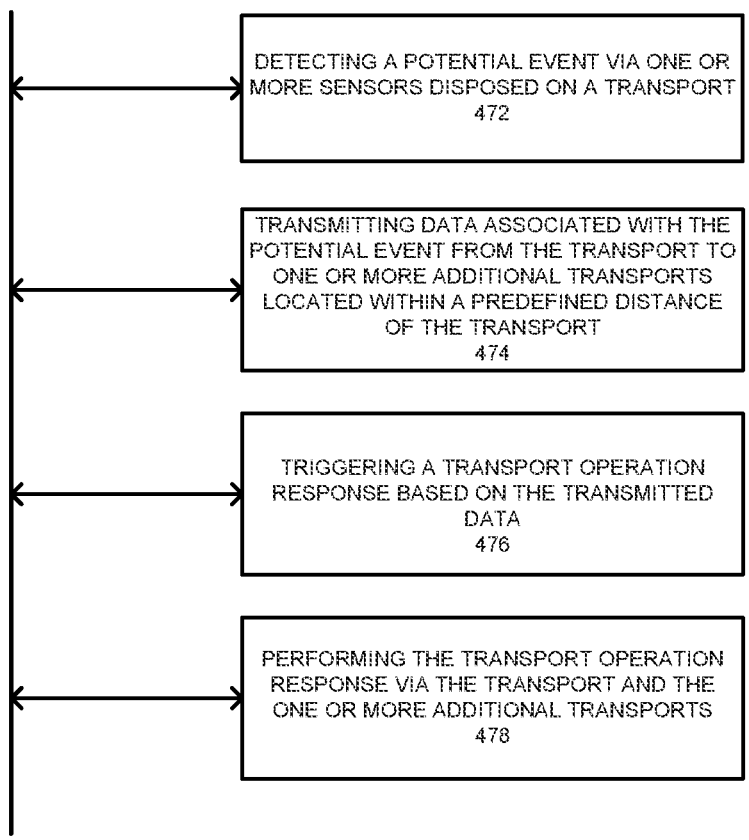
FIG. 4C illustrates yet another transport sensor data sharing flow diagram, according to example embodiments.

FIG. 4C illustrates yet a further transport sensor data sharing flow diagram, according to example embodiments. Referring to FIG. 4C, the flow chart 470 may provide one or more of detecting a potential event via one or more sensors on a transport 472, sending data associated with the potential event from the transport to one or more additional transports located within a predefined distance of the transport 474, triggering a transport operation response based on the sent data 476, and performing the transport operation response via the transport and the one or more additional transports 478. The response messages sent to the transports may include actions to modify the transport operation.

The example may also include sending the potential event data to the one or more additional transports by sending a first notification from the transport to a first additional transport within the predefined distance threshold of the transport, and when a transport location of the first transport is beyond the predefined distance with respect to a second additional transport and the first additional transport is within the predefined distance of the second additional transport, sending a second notification from the first additional transport to the second additional transport. The one or more sensors include one or more of a motion sensor, a light sensor, a noise sensor, an accelerometer, a radar sensor, a velocity sensor, a collision sensor, an infrared sensor, lidar, etc. The potential event may include one or more of an object detected on or near a roadway, a transport moving outside an expected area on the roadway, a transport operating above or below one or more thresholds related to speed, braking, etc.

The example may also include sending event data (potential event and/or actual event) from the transport to a remote server via a first communication medium and a first communication protocol, and sending a notification comprising event data from the remote server to the one or more additional transports. The event data is sent from the transport to the one or more additional transports via a second communication medium and second communication protocol that is different from the first communication medium. The example may also include determining one or more types of sensors among the one or more sensors that detected the event, identifying a velocity of the transport at a time associated with the one or more sensors detecting the potential event, determining a severity level of the potential event based on the types of sensors used to detect the potential event and the identified velocity of the transport, and selecting a type of transport operation response based on the determined severity level. The type of transport operation response includes one or more of an alert, a braking operation, a transport velocity modification operation, a safety measure trigger operation, a gear changing operation, a navigation route modification operation, and a steering wheel turning operation. The example may also provide identifying a smart contract associated with the event, executing the smart contract responsive to detecting the event, and creating a blockchain transaction with the event data, an identification of the transport, an identification of the one or more additional transports and a result of the event.

Figure 5:
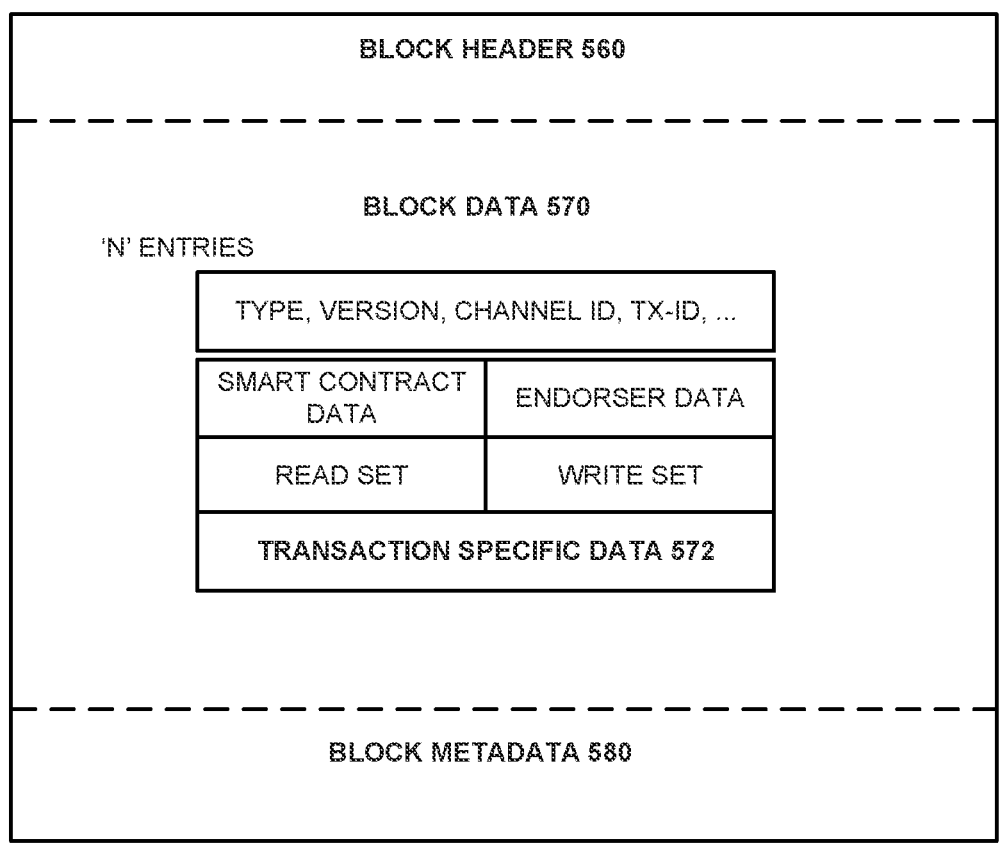
FIG. 5 illustrates an example data block, according to example embodiments.

FIG. 5 illustrates a process 500 of a new block being added to a distributed ledger, according to example embodiments, and contents of a block structure 550 for a blockchain, according to example embodiments. Referring to FIG. 5, clients (not shown) may submit entries to blockchain nodes. Clients may receive instructions from any source to enact activity on the blockchain. As an example, clients may act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The distributed ledger includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The blockchain is an entry log, structured as hash-linked blocks where each block contains a sequence of N entries. Blocks may include various components such as those shown in FIG. 5. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 550 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5, a block 550 (also referred to as a data block) that is stored on the blockchain of the distributed ledger may include multiple data segments such as a block header 560, transaction specific data 572, and block metadata 580. Transaction specific data 572 consists of any of the data described or depicted herein, such as data related to a potential event. It should be appreciated that the various depicted blocks and their contents, such as block 550 and its contents. shown in FIG. 5 are merely for purposes of example and are not meant to limit the scope of the example embodiments. In some cases, both the block header 560 and the block metadata 580 may be smaller than the transaction specific data 572 which stores entry data, however this is not a requirement. The block 550 may store transactional information of N entries (e.g., 100, 500, 1000, 2000, 3000, etc.) within the block data 570. The block 550 may also include a link to a previous block (e.g., on the blockchain) within the block header 560. In particular, the block header 560 may include a hash of a previous block's header. The block header 560 may also include a unique block number, a hash of the block data 570 of the current block 550, and the like. The block number of the block 550 may be unique and assigned in an incremental/sequential order starting from zero. The first block in the blockchain may be referred to as a genesis block which includes information about the blockchain, its members, the data stored therein, etc.

The block data 570 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 570 may also store transaction specific data 572 which adds additional information to the hash-linked chain of blocks in the blockchain. Accordingly, the data 572 can be stored in an immutable log of blocks on the distributed ledger. Some of the benefits of storing such data 572 are reflected in the various embodiments disclosed and depicted herein. The block metadata 580 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 570 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
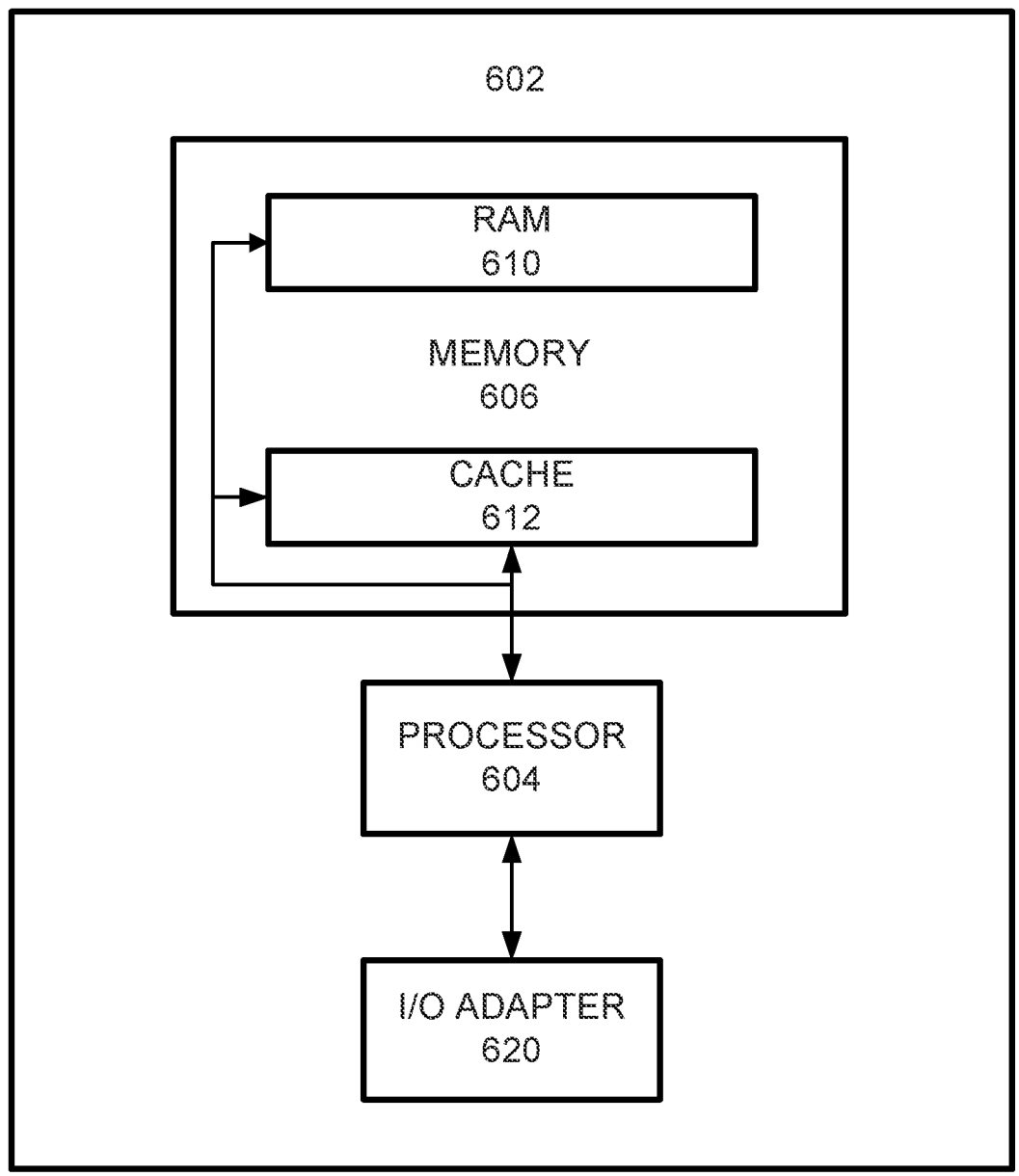
FIG. 6 illustrates an example system that supports one or more of the example embodiments.

FIG. 6 is not intended to suggest any limitation as to the scope of use or functionality of embodiments of the application described herein. Regardless, the computing node 800 is capable of being implemented and/or performing any of the functionality set forth herein.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit,"

"module" or "system." Furthermore, aspects of the present application may take the form of a computer program product embodied in one or more computer readable medium(s) having computer readable program code embodied thereon.

Computer system/server 602 may also communicate with one or more external devices via an I/O adapter 720 such as a keyboard, a pointing device, a display, etc.; one or more devices that enable a user to interact with computer system/server 602; and/or any devices (e.g., network card, modem, etc.) that enable computer system/server 602 to communicate with one or more other computing devices. Such communication can occur via I/O interfaces via adapter 720. Still yet, computer system/server 602 can communicate with one or more networks such as a local area network (LAN), a general wide area network (WAN), and/or a public network (e.g., the Internet) via network adapter. As depicted, network adapter communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   transmitting data related to a potential event from a transport to one or more additional transports;
   based on the transmitted data:
   identifying a velocity of the transport associated with the potential event;
   determining a severity level of the potential event; and
   performing an operation, via the transport and the one or more additional transports, based on the determined severity level.

2. The method of claim 1, wherein the transmitting the data further comprises:

sending a first notification from the transport to a first of the one or more additional transports within a distance threshold of the first transport.

3. The method of claim 2, further comprising, when a transport location of the transport is beyond the distance with respect to a second of the one or more additional transports and the first of the one or more additional transports is within a potential distance of the second of the one or more additional transports, sending a second notification from the first of the one or more additional transports to the second of the one or more additional transports.

4. The method of claim 1, wherein one or more sensors comprise one or more of a motion sensor, a light sensor, a noise sensor, an accelerometer, a radar sensor, a velocity sensor, a collision sensor, and an infrared sensor.

5. The method of claim 1, wherein the potential event comprises one or more of: an object detected on the roadway, another transport moving outside an expected travel space on the roadway, another transport moving beyond or below one or more velocity thresholds, and a collision event.

6. The method of claim 1, further comprising:
sending data of the potential event from the transport to a remote server via a first communication medium and a first communication protocol; and
sending a notification comprising the data of the potential event from the remote server to the one or more additional transports.

7. The method of claim 6, wherein data of the potential event is sent from the transport to the one or more additional transports via a second communication medium and second communication protocol, wherein the second communication medium is different from the first communication medium.

8. The method of claim 1, wherein the type of operation response comprises one or more of an alert, a braking operation, a transport velocity modification operation, a safety measure trigger operation, a gear changing operation, a navigation route modification operation, and a steering wheel turning operation.

9. The method of claim 1, further comprising:
creating a blockchain transaction comprising data of the potential event, an identification of the transport, an identification of the one or more additional transports and a result of the potential event.

10. The method of claim 1, wherein the transmitting the data further comprises:
sending a first notification from the transport to a first of the one or more additional transports within a distance threshold of the first transport.

11. A system, comprising:
a processor and one or more sensors on a first transport;
a non-transitory memory that stores instructions that when executed by the processor, cause the processor to:
transmit data related to a potential event from a transport to one or more additional transports;
based on the transmitted data:
identify a velocity of the transport associated with the potential event;
determine a severity level of the potential event; and
perform an operation, via the transport and the one or more additional transports, based on the determined severity level.

12. The system of claim 11, wherein data of the potential event being sent to the one or more additional transports further comprises causing the processor to:
send a first notification from the transport to a first of the one or more additional transports within a distance threshold of the first transport.

13. The system of claim 11, wherein the processor is further caused to, when a transport location of the first transport is beyond the distance with respect to a second additional transport and the first additional transport is within a potential distance of the second additional transport, send a second notification from the first additional transport to the second additional transport.

14. The system of claim 11, wherein the one or more sensors comprise one or more of a motion sensor, a light sensor, a noise sensor, an accelerometer, a radar sensor, a velocity sensor, a collision sensor, and an infrared sensor.

15. The system of claim 11, wherein the potential event comprises one or more of: an object detected on the roadway, another transport in motion outside an expected travel space on the roadway, another transport in motion beyond or below one or more velocity thresholds, and a collision event.

16. The system of claim 11, wherein the processor is further caused to:
send data of the potential event from the transport to a remote server via a first communication medium and a first communication protocol; and
send a notification comprising the data of the potential event from the remote server to the one or more additional transports.

17. The system of claim 16, wherein data of the potential event is sent from the transport to the one or more additional transports via a second communication medium and second communication protocol, wherein the second communication medium is different from the first communication medium.

18. The system of claim 11, wherein the type of operation response comprises one or more of an alert, a brake operation, a transport velocity modification operation, a safety measure trigger operation, a gear change operation, a navigation route modification operation, and a steering wheel turn operation.

19. The system of claim 11, wherein the processor is further caused to:
create a blockchain transaction comprising data of the potential event, an identification of the transport, an identification of the one or more additional transports and a result of the potential event.

20. A non-transitory computer readable medium comprising instructions, that when read by a processor, cause the processor to perform:
transmitting data related to a potential event from a transport to one or more additional transports;
based on the transmitted data:
identifying a velocity of the transport associated with the potential event;
determining a severity level of the potential event; and
performing an operation, via the transport and the one or more additional transports, based on the determined severity level.

* * * * *